(12) United States Patent
Keyser et al.

(10) Patent No.: US 10,243,319 B1
(45) Date of Patent: Mar. 26, 2019

(54) TUNABLE LASER SYSTEM AND AMPLIFIER USING A NOBLE GAS-FILLED HOLLOW-CORE FIBER WAVEGUIDE

(71) Applicant: The United States of America, as represented by the Secretary of the Air Force, Washington, DC (US)

(72) Inventors: Christian K. Keyser, Shalimar, FL (US); Chad M. Welsh, Niceville, FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 16/030,085

(22) Filed: Jul. 9, 2018

(51) Int. Cl.
| | |
|---|---|
| H01S 3/00 | (2006.01) |
| H01S 3/131 | (2006.01) |
| H01S 3/067 | (2006.01) |
| H01S 3/134 | (2006.01) |
| H01S 3/036 | (2006.01) |
| H01S 3/094 | (2006.01) |
| H01S 3/30 | (2006.01) |

(52) U.S. Cl.
CPC .......... *H01S 3/1317* (2013.01); *H01S 3/0092* (2013.01); *H01S 3/036* (2013.01); *H01S 3/06741* (2013.01); *H01S 3/094003* (2013.01); *H01S 3/134* (2013.01); *H01S 3/305* (2013.01)

(58) Field of Classification Search
CPC ..... H01S 3/0092; H01S 3/06741; H01S 3/305
See application file for complete search history.

(56) References Cited

U.S. PATENT DOCUMENTS

| | | | |
|---|---|---|---|
| 7,821,704 B1 | 10/2010 | Pepper et al. | |
| 8,284,809 B2 | 10/2012 | Armstrong et al. | |
| 8,681,421 B1 | 3/2014 | Pepper et al. | |
| 2014/0334763 A1 | 11/2014 | Holzer et al. | |
| 2016/0099539 A1* | 4/2016 | Creeden | H01S 3/06716 359/328 |

OTHER PUBLICATIONS

Dispersion measurement of inert gases and gas mixtures at 800 nm, Applied Optics / vol. 47, No. 27 / Sep. 20, 2008, 4856-4863.
Intensity-Dependent Phase-Matching Effects on Four-Wave Mixing in Optical Fibers, Journal of Lightwave Technology, vol. 17, No. 11, Nov. 1999, 2285-2290.

(Continued)

*Primary Examiner* — Michael Carter
(74) *Attorney, Agent, or Firm* — AFMCLO/JAZ; James McBride (57) ABSTRACT

An optical system including a laser system for generating a plurality of coaxial laser beams. The laser beams are combined by the laser system for generating at least two different frequency components. One or more hollow core photonic crystal fibers each filled with a noble gas receive the coaxial laser beams from the laser system and generate an idler emission having an idler frequency component according to four-wave mixing of the at least two different frequency components in the one or more hollow core photonic crystal fibers. A control system is configured to control a gas pressure of the one or more hollow core photonic crystal fibers for controlling the idler frequency component of the idler emission.

20 Claims, 4 Drawing Sheets

(56) References Cited

OTHER PUBLICATIONS

Mid-infrared supercontinuum generation in supercritical xenon-filled hollow-core negative curvature fibers, vol. 41, No. 21 / Nov. 1, 2016 / Optics Letters, 5122-5125.

Negative curvature fibres: Exploiting the potential for novel optical sensors, 24th International Conference on Optical Fibre Sensors, edited by Hypolito José Kalinowski, José Luís Fabris, Wojtek J. Bock, Proc. of SPIE vol. 9634, 963455-1.

Negative Curvature Hollow-Core Optical Fiber, IEEE Journal of Selected Topics in Quantum Electronics, vol. 22, No. 2, Mar./Apr. 2016.

Nonlinear optics in Xe-filled hollow-core PCF in high pressure and supercritical regimes, Appl. Phys. B (2013) 112:457-460.

Ultrafast nonlinear optics in gas-filled hollow-core photonic crystal fibers [Invited], vol. 28, No. 12 / Dec. 2011 / J. Opt. Soc. Am. B A11- A26.

* cited by examiner

TUNABLE LASER SYSTEM AND AMPLIFIER USING A NOBLE GAS-FILLED HOLLOW-CORE FIBER WAVEGUIDE

GOVERNMENT INTEREST

The invention described herein may be manufactured and used by or for the Government of the United States for all governmental purposes without the payment of any royalty.

FIELD OF THE INVENTION

The present disclosure relates generally to lasers. More particularly, the present disclosure relates to a laser system in which multiple laser sources propagate in hollow core photonic crystal fibers to produce a mid- to long-wave infrared idler emission that is tunable over a wide spectral bandwidth.

BACKGROUND OF THE INVENTION

Four-wave mixing (FWM) is an intermodulation phenomenon where at least two different frequency components propagate together in an optical waveguide, such as an optical fiber, to generate an idler emission having a longer wavelength than the wavelengths of the frequency components propagating in the waveguide. Further, one of the pre-existing frequency components can be amplified through parametric amplification of the different frequency components propagating in the optical waveguide. FWM is often applied for spectroscopy where two input waves generate an idler emission with a slightly higher optical frequency. FWM can also be applied for phase conjugation, holographic imaging, and optical imaging processing.

Degenerate FWM results when one or more pump lasers produce the same frequency component (i.e., a single pump laser produces a laser beam at one frequency or two pump lasers produce laser beams having the same frequency), and the frequency from the one or more pump lasers is used to provide amplification to a signal laser. The signal laser is often referred to as a seed laser because it helps initiate the FWM process and is typically a lower powered laser as compared to the one or more pump lasers.

During FWM, the pump laser provides the energy to generate the idler emission while also amplifying the frequency component of the signal laser. More specifically, for every photon being added to the signal frequency component, two photons are taken away from the pump frequency component with the remaining photon being added to the idler emission. As FWM is a phase-sensitive process, its effect can efficiently accumulate over longer distances if a phase matching condition is optimized. On the other hand, if there is a strong phase mismatch, FWM is effectively suppressed.

So long as the phase matching condition is satisfied, the frequency component of the idler emission is a function of various operating conditions including primarily the pump laser(s)' wavelength and power, the signal laser's wavelength and power, and transmission and dispersion properties of the optical waveguide where the FWM occurs. Given that the pump laser(s)' wavelength is typically constant based on the pump laser(s) selected, limitations in the spectral tuning range during FWM can be encountered due to the transmission and dispersion properties of the optical waveguide. Hollow core photonic crystal fibers (HCPCFs) filled with a noble gas have been found to be an ideal optical wave guide for optimizing the FWM phase matching conditions and for the avoidance of Raman interactions during FWM.

What is needed is a system for optimizing FWM efficiency in gas-filled HCPCFs by making sure the phase matching condition is met by the pump and signal frequency components over a wide spectral bandwidth for the idler emission.

SUMMARY OF THE INVENTION

The above and other needs are met by an optical system according to one embodiment of the disclosure including a laser system having a plurality of lasers for generating a plurality of coaxial laser beams having at least two different frequency components. One or more hollow core photonic crystal fibers each filled with a noble gas receive the plurality of coaxial laser beams from the laser system and generate an idler emission having an idler frequency component according to four-wave mixing of the at least two different frequency components in the one or more hollow core photonic crystal fibers. The optical system further includes a control system configured to control a gas pressure of the one or more hollow core photonic crystal fibers for controlling the idler frequency component of the idler emission.

According to certain embodiments, the control system is further configured to control a gas temperature of the one or more hollow core photonic crystal fibers for tuning of the idler frequency component of the idler emission. According to some embodiments, the control system is configured to vary the gas temperature of the one or more hollow core photonic crystal fibers between about 273K to about 400K or alternatively between about 273K to about 373K. For example, when the gas is Xenon, the control system may be configured to vary the gas temperature of the one or more hollow core photonic crystal fibers between about 289K to about 373K.

According to certain embodiments, the plurality of lasers includes a signal laser for generating a signal laser beam having a signal frequency component and the control system is further configured to tune the signal frequency component for tuning of the idler frequency component of the idler emission.

According to certain embodiments, the at least two different frequency components of the plurality of coaxial laser beams generated by the laser system each have a wavelength of greater than 0 microns but less than about 2 microns and the idler frequency component includes a wavelength greater than 2 microns. In one embodiment, the at least two different frequency components of the plurality of coaxial laser beams generated by the laser system each may have a wavelength of about 0.27 microns to less than 2 microns and the idler frequency component includes a wavelength greater than 2 microns or a wavelength greater than 2 microns to about 10 microns.

According to certain embodiments, the plurality of lasers consists of a signal laser for generating a signal laser beam having a signal frequency component having a wavelength of about 0.5 microns to about 2 microns and a pump laser for generating a pump laser beam having a pump frequency component having a wavelength of about 1 micron to about 2 microns. According to this embodiment, the wavelength of the pump frequency component is greater than the wavelength of the signal frequency component and the idler frequency component has a wavelength greater than 2 microns or greater than 2 microns to about 10 microns.

According to other embodiments, the plurality of lasers includes a signal laser for generating a signal laser beam having a signal frequency component with a wavelength of about 0.5 microns to about 2 microns and a plurality of pump lasers each for generating a pump laser beam having a pump frequency component with a wavelength of about 1 micron to about 2 microns. According to this embodiment, each of the wavelengths of the pump frequency components are greater than the wavelength of the signal frequency component and the idler frequency component has a wavelength greater than 2 microns or greater than 2 microns to about 10 microns.

According to certain embodiments, the one or more hollow core photonic crystal fibers each include a diameter of about 5 microns to about 20 microns. In some embodiments, the one or more hollow core photonic crystal fibers are disposed in a controlled environment, and the control system controls the gas pressure of the fibers by controlling a gas pressure of the controlled environment. The one or more hollow core photonic crystal fibers may include microholes in an outer surface of the fibers for facilitating control of the gas pressure of the one or more hollow core photonic crystal fibers.

According to another embodiment of the disclosure, an optical system comprises a laser system including a signal laser for generating a signal laser beam having a signal frequency component and one or more pump lasers each for generating a pump laser beam having a pump frequency component. The signal laser beam and the one or more pump laser beams are combined by the laser system for generating at least two coaxial laser beams having different frequency components. The optical system further includes one or more hollow core photonic crystal fibers each filled with a noble gas for receiving the at least two coaxial laser beams from the laser system and generating an idler emission having an idler frequency component according to four-wave mixing of the at least two coaxial laser beams in the one or more hollow core photonic crystal fibers. A control system is configured to control a gas pressure and a gas temperature of the one or more hollow core photonic crystal fibers for controlling the idler frequency component of the idler emission.

According to certain embodiments, the gas pressure is controlled for coarse tuning of the idler frequency component and the gas temperature is controlled for fine tuning of the idler frequency component. According to some embodiments, the control system is operable to vary the gas pressure of the one or more hollow core photonic crystal fibers between about 1 atm to about 200 atm for coarse tuning and operable to vary the gas temperature of the one or more hollow core photonic crystal fibers between about 273K to about 400K or alternatively between about 273K to about 373K for fine tuning. For example, when the gas is Xenon, the control system may be configured to vary the gas temperature of the one or more hollow core photonic crystal fibers between about 289K to about 373K.

According to certain embodiments, the control system is further configured to tune the signal frequency component for tuning of the idler frequency component of the idler emission.

According to certain embodiments, the laser system consists of the signal laser and a pump laser with the signal frequency component of the signal laser including a wavelength of about 0.5 microns to about 2 microns and the pump frequency component of the pump laser including a wavelength of about 1 micron to about 2 microns. According to this embodiment, the wavelength of the pump frequency component is greater than the wavelength of the signal frequency component and the idler frequency component has a wavelength greater than 2 microns or greater than 2 microns to about 10 microns.

According to other embodiments, the laser system includes at least two pump lasers with the signal frequency component of the signal laser including a wavelength of about 0.5 microns to about 2 microns and the pump frequency component of each of the at least two pump lasers including a wavelength of about 1 micron to about 2 microns. According to this embodiment, each of the wavelengths of the pump frequency components are greater than the wavelength of the signal frequency component and the idler frequency component has a wavelength greater than 2 microns or greater than 2 microns to about 10 microns.

According to yet another embodiment of the disclosure, a method for producing a tunable idler emission having a wavelength greater than about 2 microns or greater than 2 microns to about 10 microns includes providing a laser system including a signal laser for generating a signal laser beam having a signal frequency component and one or more pump lasers each for generating a pump laser beam having a pump frequency component, the signal laser beam and the one or more pump laser beams being combined by the laser system for generating at least two coaxial laser beams having different frequency components; transmitting the at least two coaxial laser beams through one or more hollow core photonic crystal fibers each filled with one or more noble gases to generate an idler emission having an idler frequency component according to four-wave mixing of the at least coaxial laser beams; providing a control system configured to control a gas pressure and a gas temperature of the one or more hollow core photonic crystal fibers and tune the signal component of the signal laser beam; and tuning the idler frequency component of the idler emission by varying one or more of the gas pressure of the one or more hollow core photonic crystal fibers, the gas temperature of the one or more hollow core photonic fibers, and the signal frequency component of the signal laser beam.

According to certain embodiments, the signal frequency component of the signal laser includes a wavelength of about 0.5 microns to about 2 microns, the pump frequency component of the one or more pump lasers includes a wavelength of about 1 micron to about 2 microns, and the wavelength of each of the pump frequency components is greater than the wavelength of the signal frequency component.

According to certain embodiments, the tuning step includes one or more of varying the gas pressure of the one or more hollow core photonic crystal fibers between about 1 atm to about 200 atm for coarse tuning of the idler frequency component or varying the gas temperature of the one or more hollow core photonic crystal fibers between about 273K to about 400K or alternatively between about 273K to about 373K for fine tuning of the idler frequency component. For example, when the gas is Xenon, the control system may be configured to vary the gas temperature of the one or more hollow core photonic crystal fibers between about 289K to about 373K.

According to certain embodiments, the one or more hollow core photonic crystal fibers are disposed within a controlled environment and the control system is configured to control the gas pressure and the gas temperature of the one or more hollow core photonic crystal fibers by controlling a gas pressure and a temperature of the controlled environment.

BRIEF DESCRIPTION OF THE DRAWINGS

Other embodiments of the disclosure will become apparent by reference to the detailed description in conjunction with the figures, wherein elements are not to scale so as to more clearly show the details, wherein like reference numbers indicate like elements throughout the several views, and wherein.

DETAILED DESCRIPTION OF THE INVENTION

Figure 1:
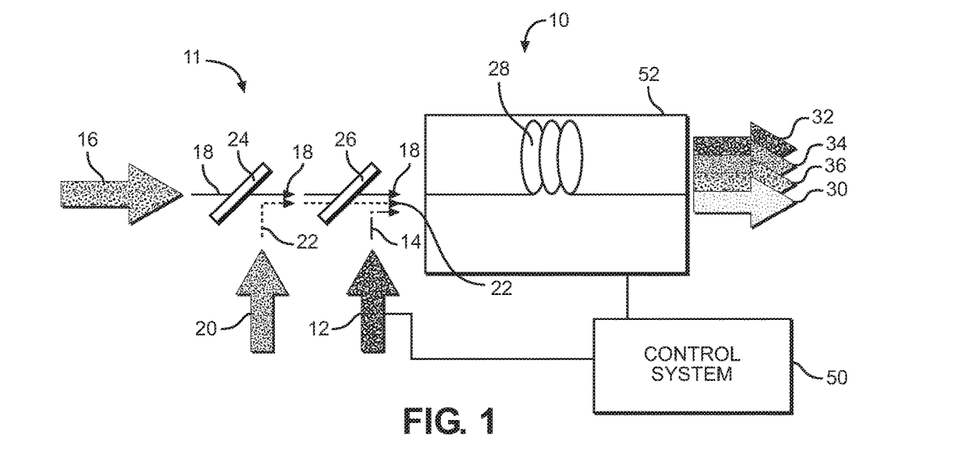
FIG. 1 is a schematic of an optical system according to one embodiment of the disclosure.

Referring to FIG. 1, the present disclosure provides an optical system 10 generally including a laser system 11, a waveguide 28 for receiving laser beams from laser system 11, and a control system 50 (the control system being further described below). The laser system 11 generally includes a first laser 12 for generating a first laser beam 14 having a first frequency component, a second laser 16 for generating a second laser beam 18 having a second frequency component, and a third laser 20 for generating a third laser beam 22 having a third frequency component. According to this embodiment, the first laser 12 is a signal/seed laser and the first frequency component is a signal frequency component. On the other hand, the second laser 16 and third laser 20 are pump lasers for generating pump laser beams having pump frequency components as the second frequency component and third frequency component, respectively. The second laser 16 (also referred to herein as pump laser 16) and third laser 20 (also referred to herein as pump laser 20) are referred to as "pump" lasers because they transfer energy to the other laser beams in the optical system 10. The second frequency component of second laser beam 18 and third frequency component of third laser beam 22 generated by the pump lasers typically have a greater wavelength than the first frequency component of first laser beam 14 generated by the signal laser 12.

As shown in FIG. 1, according to laser system 11, pump laser 16 and pump laser 20 are directed to a first beam combiner 24 to generate a coaxial second laser beam 18 and third laser beam 22. The coaxial second and third laser beams 18, 22 are then directed from the first beam combiner 24 to a second beam combiner 26, where the second and third laser beams 18, 22 are joined by the first laser beam 14 of the signal laser 12 to generate a coaxial first laser beam 14, second laser beam 18, and third laser beam 22 that are directed from the second beam combiner 26 to one or more gas-filled hollow core photonic crystal fibers 28 (HCPCFs) where four-wave mixing (FWM) occurs to generate an idler emission 30 in addition to a first laser beam emission 32 corresponding to first laser beam 14, second laser beam emission 34 corresponding to second laser beam 18, and third laser beam emission 36 corresponding to third laser beam 22. For purposes of the present disclosure, the idler emission 30 refers to the emission being generated from the FWM of the different frequency components in the HPCFs. In typical embodiments, the idler emission 30 is the emission with the largest wavelength while the first laser beam emission 32 is the emission being amplified from the FWM at the expense of the second laser beam emission 34 and third laser beam emission 36. In preferred embodiments, the HCPCFs are filled with one or more noble gases such as xenon, argon, radon, helium, and neon. In most preferred embodiments, the noble gas is xenon (Xe).

According to certain embodiments, the second laser beam 18 generated from pump laser 16 and third laser beam 22 generated from pump laser 20 have the same wavelength, and degenerate FWM (laser system 11 includes only two different frequency components) occurs in the one or more gas-filled HCPCFs 28 to produce the idler emission 30. However, according to other embodiments, the second frequency component 18 generated from pump laser 16 and third frequency component 22 generated from pump laser 20 have different wavelengths, and non-degenerate FWM (laser system 11 includes four different frequency components) occurs in the one or more gas-filled HCPCFs 28 to produce the idler emission 30. According to embodiments where the second and third frequency components 18, 22 have different wavelengths, greater control and tuning of the FWM conditions in the HCPCFs is possible. However, the added control comes at the expense of mechanical complexity of the system as well as the additional cost of using two pump lasers. It should also be understood that the laser system 11 can include up to four pump and signal lasers so long as at least two frequency components are different, though each additional laser adds to the cost and complexity of the system.

According to certain embodiments, the frequency component of the signal laser 12 will have a wavelength in the range of about 0.5 microns to about 2 microns while the frequency components of the pump lasers 16, 20 will have a wavelength in the range of about 1 micron to about 2 microns. Within these parameters, the optical system 10 of FIG. 1 is believed to be particularly useful for generating mid- to long-wave infrared (IR) idler emissions 30 that are not easily produced with more readily available IR signal and pump lasers. In this regard, near- to short-wave IR signal lasers are readily available. The pump lasers 16 and 20, while being higher power lasers as compared to the signal laser 12, are also readily available near- to short-wave lasers. Thus, using laser system 11, readily available near- to short-wave lasers are able to generate a mid- to long-wave idler emission 30 while also amplifying the frequency of the signal laser 12. For purposes of the present disclosure, near- to short-wave laser beams include a wavelength of between about 700 nanometers to about 2 microns and mid- to long-wave laser beams include a wavelength of greater than two microns. Thus, according to preferred embodiments, optical system 10 is preferably used to produce an idler emission 30 having an idler wavelength of greater than 2 microns from a signal laser 12 and two or more pump lasers each having wavelengths of greater than 0 microns but less than about 2 microns.

Figure 2:
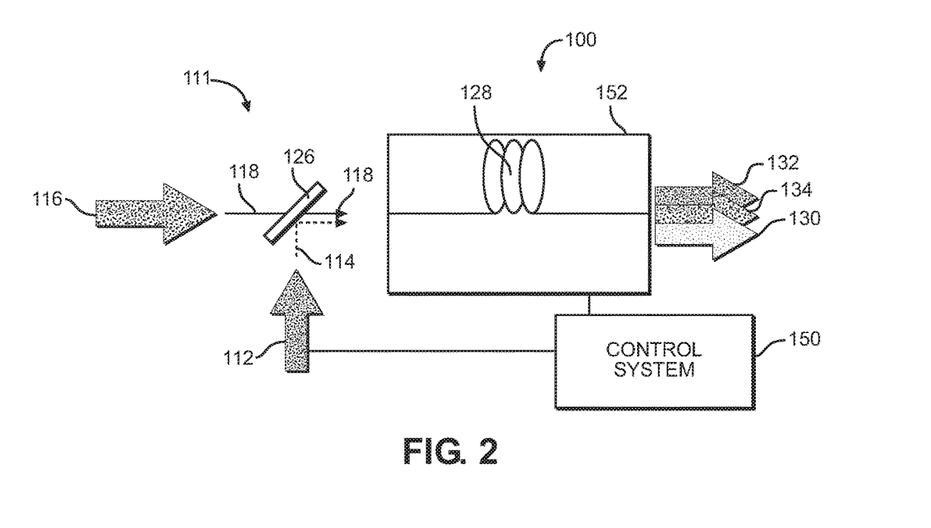
FIG. 2 is a schematic of an optical system according to another embodiment of the disclosure.

Referring to FIG. 2, an optical system 100 according to another embodiment of the disclosure includes a laser system 111, waveguide 128, and a control system 150 (the control system 150 being further described below). The laser system 111 includes a signal laser 112 for generating a first laser beam 114 having a signal frequency component and a pump laser 116 for generating a second laser beam 118 having a pump frequency component. In other words, as compared to optical system 10 of FIG. 1, optical system 100 includes one pump laser 116 instead of a plurality of pump lasers. The first and second laser beams 114, 118 are directed to a beam combiner 126 to generate a coaxial first laser beam 114 and second laser beam 118. The coaxial first laser beam 114 and second laser beam 118 are directed to one or more gas-filled HCPCFs 128 where degenerate FWM occurs to produce an idler emission 130 in addition to a first laser beam emission 132 corresponding to first laser beam 114 and second laser beam emission 134 corresponding to second laser beam 118 so long as the signal frequency component of first laser beam 114 is different than the pump frequency component of the second laser beam 118 and phase matching conditions of the two laser beams are met in the HCPCFs 128.

The optical system 100 of FIG. 2 is believed to be particularly useful for providing a relatively simple and inexpensive optical system (i.e., only one signal laser 112 and one pump laser 116) capable of generating a mid- to long-wave idler emission 130 from a near- to short-wave signal laser 112, such as a standard diode laser, and a near- to short-wave pump laser 116 having a wavelength that is smaller than the wavelength of the idler emission 130. In this regard, according to preferred embodiments, the near- to short-wave pump laser 116 and near- to short-wave signal laser 112 is able to generate a mid- to long-wave idler emission 130 having a longer wavelength than available from the signal laser 112 and pump laser 116 alone. Further, the higher powered pump laser 116 provides pulsed amplification of the signal laser 112.

Referring to both the optical system 10 of FIG. 1 and the optical system 100 of FIG. 2, the present disclosure provides for the ability to control and tune the idler emission 30, 130 over a wide spectral bandwidth by controlling/tuning certain parameters and operating conditions of the optical system to meet the phase matching conditions of the FWM of the frequency components propagating in the gas-filled HCPCFs 28, 128. In this regard, when tuning the optical system 10 or 100, the objective is to enable phase matching of the coaxial laser beams in the optical waveguide given other static parameters of the particular system. When phase matching (PM) occurs (i.e., PM=0 in the below equations), the optical system 10, 100 is optimized for the particular parameters and operating conditions of the optical system. Further, when PM=0, FWM can efficiently accumulate over longer distances (i.e., longer fibers in which the coaxial laser beams travel) to amplify the idler emission 30, 130. On the other hand, efficiency of the system generally decreases as the magnitude of PM increases even though FWM may still occur. Thus, while PM can deviate somewhat from zero and still achieve FWM depending on the distance the coaxial laser beams travel through the HCPCFs, eventually FWM no longer occurs for a given optical system (with associated fiber length) the further PM deviates from optimization.

As it would be appreciated by those skilled in the art, the following equation may be used for both optical systems 10 and 100 to enable phase matching in the gas-filled HCPCFs in the small signal limit:

$$PM = k_i[r,\rho,T] + k_s[r,\rho,T] - k_{p1}[r,\rho,T] - k_{p2}[r,\rho,T] + 2\gamma[r,\rho,T] P_p$$

In the above formula, $k_i$ is the propagation constant of the frequency component for the idler emission 30 or 130, $k_s$ is the propagation constant for the frequency component of the signal laser 12 or 112, $k_{p1}$ is the propagation constant for the frequency component of the first pump laser 16 or 116; $k_{p2}$ is the propagation constant for the frequency component of a second pump laser 20 when used such as in optical system 10; $\gamma$ is the pump nonlinear parameter; r is the core radius of the HCPCFs; $\rho$ is the gas density; T is the gas temperature, and Pp is pump power. As also would be appreciated by those skilled in the art, the propagation constant k for each of the fields can be determined by the following formula for the inhibited-coupling HCPCFs:

$$k_j[r, \rho, T] = SQRT\left[k_{j,o}^2 n_{Xe}(\lambda_j, \rho, T)^2 - \frac{u_{m,n}^2}{r^2}\right]$$

where $k_{j,o}$ is the vacuum propagation constant for field j, $n_{Xe}$ is the Xe index of refraction, $u_{m,n}$ is the $n^{th}$ zero of the $m^{th}$ order Bessel function. Substituting this equation into the prior equation, using the energy conservation requirement $2\omega p=\omega s+\omega i$, and setting PM=0, one can solve for the dependence of the idler wavelength on the signal and pump wavelengths for a given gas pressure and fiber radius.

One of the dominant factors defining the tuning range in gas-filled HCPCFs 28, 128 has been found to be the gas pressure of the HCPCFs 28, 128. More specifically, for a given gas pressure of the HCPCFs 28, 128 and pump frequency component(s) of the one or more pump lasers, application of a relatively weak signal frequency component 14, 114 will produce a particular mid- to long-wave idler emission wavelength 30, 130. Modifying the gas pressure of the HCPCFs 28, 128 has been found to provide a different mid- to long-wave idler emission wavelength so long as phase matching conditions are present. Thus, the ability to modify/control the gas pressure of the HCPCFs 28, 128 provides an optical system that enables a FWM idler emission that is tunable over a broad spectral band.

Accordingly, referring both to FIG. 1 and FIG. 2, optical system 10 and 100 of the present disclosure preferably includes a control system 50, 150 in communication with the one or more gas-filled HCPCFs 28, 128. According to certain embodiments, the control system 50, 150 is configured to control a gas pressure of the HCPCFs 28, 128 for tuning the idler emission 30, 130. More specifically, the control system 50, 150 is configured to vary the gas pressure of the HCPCFs 28, 128 between about 1 atm to about 200 atm for coarse tuning of the gas pressure to meet phase matching conditions to generate the idler emission 30, 130. For purposes of the present disclosure, controlling the gas pressure is referred to "coarse tuning" because 1) it is typically difficult to provide precise changes to the gas pressure of the HCPFs; and 2) smaller changes to the gas pressure typically have a greater influence in the wavelength of the idler emission 30, 130. In most embodiments, the control system 50, 150 will vary the gas pressure of the HCPCFs within an optimum tuning range of between about 10 atm to about 200 atm for a mid- to long-wave IR idler emission 30, 130 generated from a near- to short-wave IR signal laser 12, 112 and one or more near- to short-wave IR pump lasers.

In preferred embodiments, the control system 50, 150 is further configured to control a temperature of the gas in the HCPCFs as temperature has also been found to define the tuning range of the idler emission 30, 130, particularly in combination with other operating conditions such as gas pressure. More specifically, according to certain embodiments, the control system 50, 150 is configured to coarse tune the gas pressure of the HCPCFs 28, 128 for tuning of the idler emission 30, 130 and fine tune the gas temperature of the HCPCFs 28, 128 for tuning of the idler emission 30, 130. In other words, because gas pressure has been found to be a more dominant factor in defining the tuning range than temperature, the control system 50, 150 preferably controls the gas pressure for broader tuning and the gas temperature for more fine tuning. Further, it is easier to provide more precise temperature changes to the gas as compared to gas pressure changes, which allows for fine tuning after coarse tuning with the gas pressure. According to certain embodiments, the control system is configured to vary the gas temperature of the HCPCFs 28, 128 between about 273K to about 400K or alternatively between about 273K to about 373K. In most embodiments, the control system 50, 150 will vary the gas temperature of the HCPCFs between about 293K to about 320K for an optimum fine tuning range of a mid- to long-wave IR idler emission 30, 130 generated from a near- to short-wave IR signal laser 12, 112 and one or more near- to short-wave IR pump lasers.

According to preferred embodiments, the HCPCFs 28, 128 are placed in a tube or other type of controlled environment 52, 152 such that the control system 50 can control the gas pressure and temperature of the HCPCFs 28, 128 by controlling the gas pressure and temperature of the controlled environment 52, 152. For example, the HCPCFs may be housed in a hollow tube with the tube having each end housed in a pressure tight cell. By changing the pressure in the cells, one can change the pressure of the gas in the HCPCFs. Similarly, the fibers can be housed in an enclosed tube that is placed in a temperature-controlled fluid. By changing the temperature of the fluid, one can change the temperature of the gas in the HCPCFs.

According to certain embodiments, the gas filled HCPCFs 28, 128 may also include micro-holes disposed in the periphery of each of the fibers to enable quicker pressure and temperature changes by the control system 50, 150. For example, HCPCFs 28, 128 having micro-holes disposed in the periphery of each of the fibers are placed in a tube or other type of controlled environment 52, 152 as described above. Gas is introduced to the controlled environment and fills each of the HCPCFs 28, 128 through the open ends of the HCPCFs and the micro-holes in the periphery of the fibers. The control system 50, 150 is then able to quickly and efficiently change the gas pressure and gas temperature inside the HCPCFs by controlling the gas pressure and temperature of the controlled environment 52, 152.

As also shown in FIGS. 1-2, the control system 50, 150 may also be configured to communicate with and control the signal laser 12, 112 to vary the signal frequency component. In preferred embodiments, each of the gas pressure of the HCPCFs, temperature of the HCPCFs, and first frequency component of the signal laser 12, 112 are controlled/tuned to optimize phase matching or otherwise ensure phase matching conditions are present for given frequency components of the pump lasers to produce a desired idler wavelength 30, 130. When tuning the signal frequency component in conjunction with the gas pressure and gas temperature of the HCPCFs, the tuning range is believed to be in the 100's of nanometers. In contrast, if the signal frequency component is held constant while the gas pressure and gas temperature of the HCPCFs, the system includes a much narrower tuning range believed to be about 40 nanometers.

According to another aspect of the present disclosure, the HCPCFs 28, 128 of optical system 10, 100 will typically have a radius of between about 2.5 microns to about 50 microns. More preferably, the HCPCFs have a radius between about 2.5 microns to about 10 microns, and most preferably about 5 microns. In typical laser systems using HCPCFs, standard fibers are typically have a radius between about 15 microns to about 50 microns. While these standard sizes are sufficient for the present disclosure, smaller radiuses are preferred to help meet phase matching conditions and increase the amplifying effect on the idler emission 30, 130. More specifically, smaller radius fibers have been found to require much higher gas pressure to achieve phase matching conditions for wavelengths of about two microns. The high pressure increases the nonlinearity of the gas in the fiber. Further, a smaller radius increases the pump intensity in the fiber, which also increases the nonlinearity of the gas in the fiber. High nonlinearity of the gas increases FWM conversion efficiency and reduces the pump power threshold for FWM.

EXAMPLES

Figure 3:
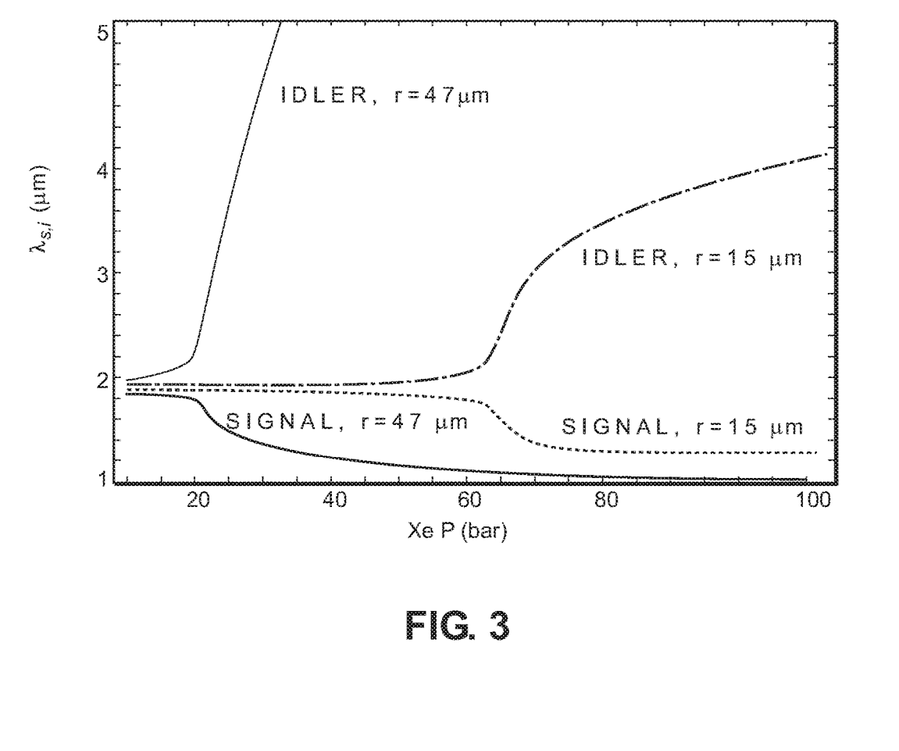
FIG. 3 is a line graph comparing the wavelength of a signal frequency component and the wavelength of an idler emission compared to the gas pressure of a gas-filled HCPCF having a radius of fifteen microns versus a gas-filled HCPCF having a radius of forty-seven microns according to one embodiment of the disclosure.

Referring to FIG. 3, using laser system 100, the wavelength of a signal frequency component from signal laser 112 and the wavelength of the idler emission 130 is compared to the gas pressure of a Xe gas-filled HCPCF 128 having a radius of 15 microns versus a Xe gas-filled HCPCF 128 having a radius of 47 microns. In this example, pump laser 116 was used to generate a pump laser beam having a wavelength of about two microns and the gas temperature was held constant at room temperature. The smaller radius fiber is shown to shift the tuning curve toward high pressure and, therefore, higher nonlinearity. As also shown, mid-IR wavelength flexibility of the idler emission 130 can be achieved through simultaneous pressure and signal wavelength tuning. Further, the smaller radius fiber produces a spectral region where the idler wavelength can be slowly tuned.

Figure 4A:
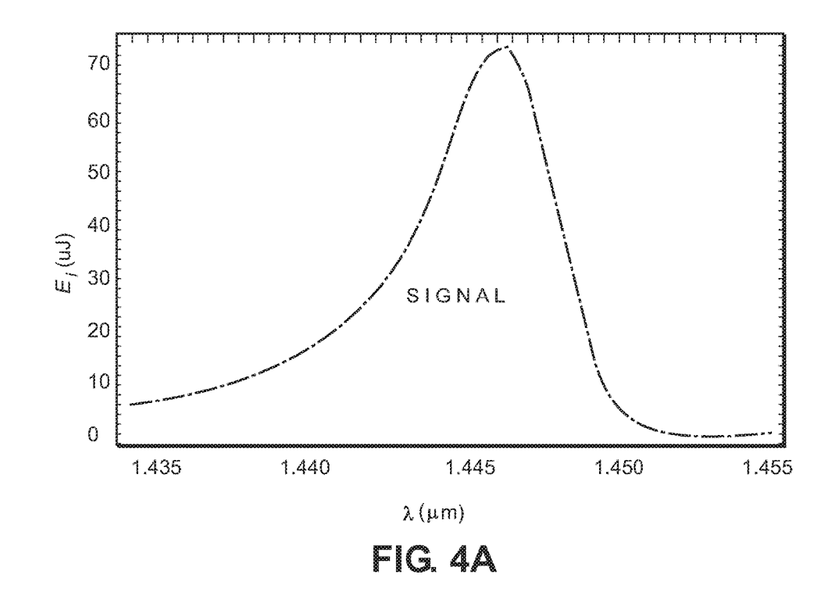
FIG. 4A and FIG. 4B are line graphs representing the tunability of an idler emission by varying the wavelength of the signal laser according to one embodiment of the disclosure.
Figure 4B:
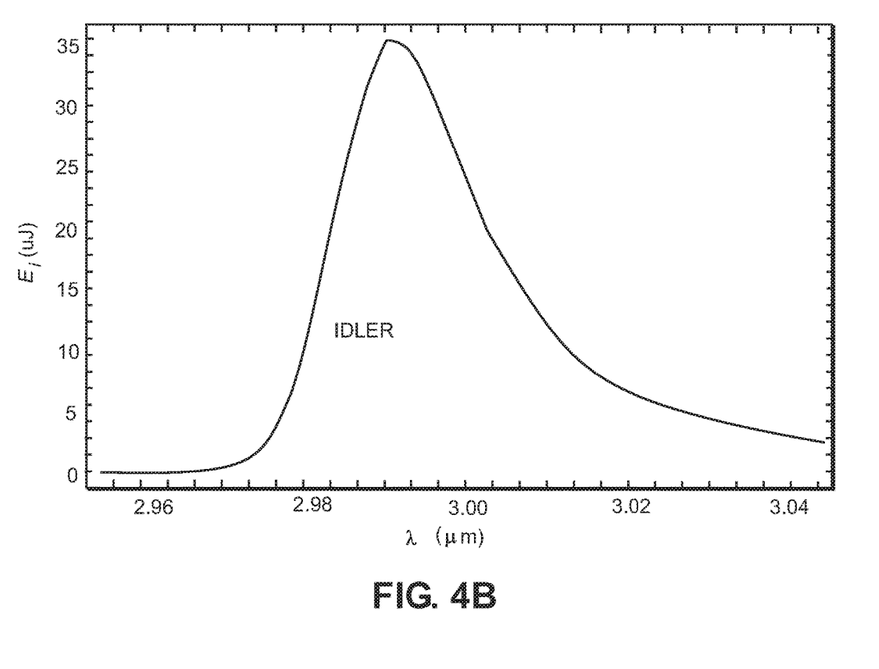

Referring to FIG. 4A, again using laser system 100, variation of the wavelength of the signal laser 112 between about 1.44 microns to about 1.45 microns using a constant gas (Xe) pressure of about 70 atm, a constant pump wavelength of about 1.95 microns, and gas temperature held constant at room temperature (shown in FIG. 4A), yields an idler wavelength tunability between about 2.97 microns to about 3.02 microns (shown in FIG. 4B) and emitted energy. As shown in FIG. 4A, the emitted energy of the signal laser as it leaves the HCPCF peaks at about 70 microjoules when the signal laser has a wavelength of about 1.445 microns. As shown in FIG. 4B, the emitted energy of the idler emission peaks at about 35 microjoules when the idler wavelength is about 2.99 microns.

Figure 5:
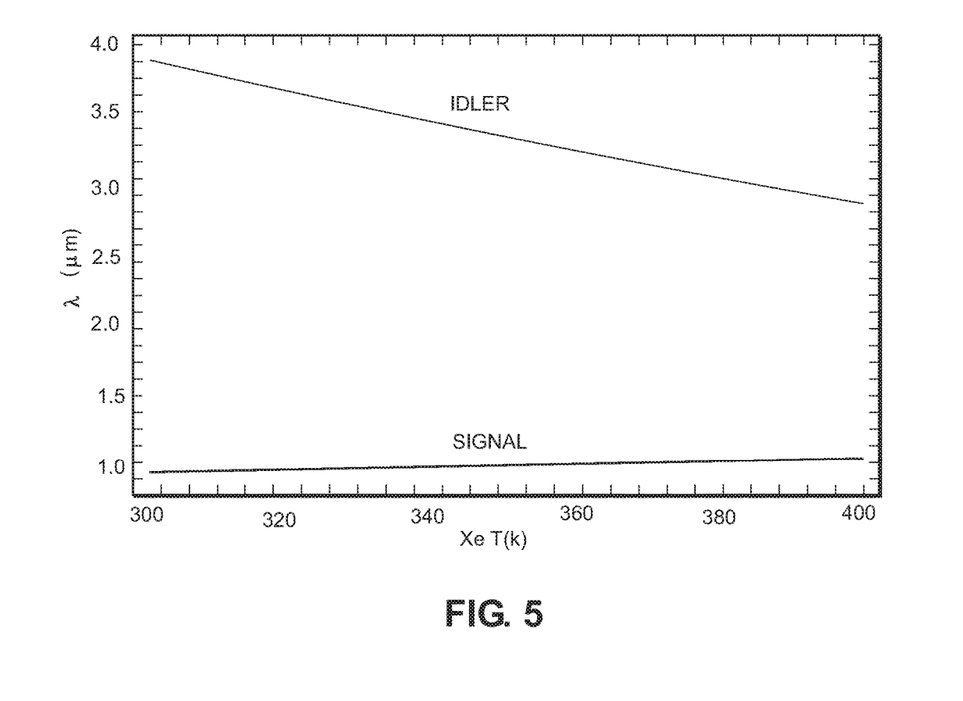
FIG. 5 is a line graph representing the tunability of an idler emission when varying the gas temperature synchronously with the wavelength of the signal laser according to one embodiment of the disclosure.

Referring to FIG. 5, yet again using laser system 100, variation of the gas temperature between about 300K to about 400K synchronously with the wavelength of the signal laser 112 from about 0.99 microns to about 1.1 microns with a constant gas (Xe) pressure of 60 atm, pump wavelength of 1.54 microns, and fiber radius of about 17.5 microns yields tunability of the idler emission 130 wavelength between about 3.9 microns to about 2.9 microns.

Unless specifically stated otherwise, as used herein, the terms "a", "an" and "the" mean "at least one".

As used herein, the terms "include", "includes" and "including" are meant to be non-limiting.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The foregoing description of preferred embodiments for this disclosure have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An optical system comprising:
   a laser system including a plurality of lasers for generating a plurality of coaxial laser beams having at least two different frequency components;
   one or more hollow core photonic crystal fibers each filled with a noble gas for receiving the plurality of coaxial laser beams from the laser system and generating an idler emission having an idler frequency component according to four-wave mixing of the at least two different frequency components in the one or more hollow core photonic crystal fibers; and
   a control system configured to control a gas pressure of the one or more hollow core photonic crystal fibers for controlling the idler frequency component of the idler emission.

2. The optical system of claim 1 wherein the control system is further configured to control a gas temperature of the one or more hollow core photonic crystal fibers for tuning of the idler frequency component of the idler emission.

3. The optical system of claim 2 wherein the control system is configured to vary the gas temperature of the one or more hollow core photonic crystal fibers between about 273K to about 400K.

4. The optical system of claim 1 wherein the plurality of lasers includes a signal laser for generating a signal laser beam having a signal frequency component, the control system being further configured to tune the signal frequency component for tuning of the idler frequency component of the idler emission.

5. The optical system of claim 1 wherein the at least two different frequency components of the plurality of coaxial laser beams generated by the laser system each have a wavelength of greater than 0 microns but less than about 2 microns and the idler frequency component includes a wavelength greater than 2 microns.

6. The optical system of claim 1 wherein:
   the plurality of lasers consists of a signal laser for generating a signal laser beam having a signal frequency component having a wavelength of about 0.5 microns to about 2 microns and a pump laser for generating a pump laser beam having a pump frequency component having a wavelength of about 1 micron to about 2 microns,
   the wavelength of the pump frequency component being greater than the wavelength of the signal frequency component, and
   the idler frequency component having a wavelength greater than 2 microns.

7. The optical system of claim 1 wherein:
   the plurality of lasers includes a signal laser for generating a signal laser beam having a signal frequency component having a wavelength of about 0.5 microns to about 2 microns and a plurality of pump lasers each for generating a pump laser beam having a pump frequency component having a wavelength of about 1 micron to about 2 microns,
   each of the wavelengths of the pump frequency components being greater than the wavelength of the signal frequency component, and
   the idler frequency component has a wavelength greater than 2 microns.

8. The optical system of claim 1, wherein the one or more hollow core photonic crystal fibers each include a diameter of about 5 microns to about 20 microns.

9. The optical system of claim 1 wherein the one or more hollow core photonic crystal fibers are disposed in a controlled environment, and the control system controls the gas pressure of the fibers by controlling a gas pressure of the controlled environment.

10. The optical system of claim 9 wherein the one or more hollow core photonic crystal fibers include micro-holes in an outer surface of the fibers for facilitating control of the gas pressure of the one or more hollow core photonic crystal fibers.

11. An optical system comprising:
    a laser system including a signal laser for generating a signal laser beam having a signal frequency component and one or more pump lasers each for generating a pump laser beam having a pump frequency component, the signal laser beam and the one or more pump laser beams being combined by the laser system for generating at least two coaxial laser beams having different frequency components;
    one or more hollow core photonic crystal fibers each filled with a noble gas for receiving the at least two coaxial laser beams from the laser system and generating an idler emission having an idler frequency component according to four-wave mixing of the at least two coaxial laser beams in the one or more hollow core photonic crystal fibers; and
    a control system configured to control a gas pressure and a gas temperature of the one or more hollow core photonic crystal fibers for controlling the idler frequency component of the idler emission.

12. The optical system of claim 11 wherein the gas pressure is controlled for coarse tuning of the idler frequency component and the gas temperature is controlled for fine tuning of the idler frequency component.

13. The optical system of claim 12 wherein the control system is operable to vary the gas pressure of the one or more hollow core photonic crystal fibers between about 1 atm to about 200 atm for coarse tuning and operable to vary the gas temperature of the one or more hollow core photonic crystal fibers between about 273K to about 400K for fine tuning.

14. The optical system of claim 11 wherein the control system is further configured to tune the signal frequency component for tuning of the idler frequency component of the idler emission.

15. The optical system of claim 11 wherein:
the laser system consists of the signal laser and a pump laser,
the signal frequency component of the signal laser includes a wavelength of about 0.5 microns to about 2 microns and the pump frequency component of the pump laser includes a wavelength of about 1 micron to about 2 microns,
the wavelength of the pump frequency component is greater than the wavelength of the signal frequency component, and
the idler frequency component has a wavelength greater than 2 microns.

16. The optical system of claim 11 wherein:
the laser system includes at least two pump lasers,
the signal frequency component of the signal laser includes a wavelength of about 0.5 microns to about 2 microns and the pump frequency component of each of the at least two pump lasers includes a wavelength of about 1 micron to about 2 microns,
each of the wavelengths of the pump frequency components being greater than the wavelength of the signal frequency component, and
the idler frequency component having a wavelength greater than 2 microns.

17. A method for producing a tunable idler emission having a wavelength greater than about 2 microns, the method comprising:
providing a laser system including a signal laser for generating a signal laser beam having a signal frequency component and one or more pump lasers each for generating a pump laser beam having a pump frequency component, the signal laser beam and the one or more pump laser beams being combined by the laser system for generating at least two coaxial laser beams having different frequency components;
transmitting the at least two coaxial laser beams through one or more hollow core photonic crystal fibers each filled with one or more noble gases to generate an idler emission having an idler frequency component according to four-wave mixing of the at least two coaxial laser beams;
providing a control system configured to control a gas pressure and a gas temperature of the one or more hollow core photonic crystal fibers and tune the signal component of the signal laser beam; and
tuning the idler frequency component of the idler emission by varying one or more of the gas pressure of the one or more hollow core photonic crystal fibers, the gas temperature of the one or more hollow core photonic fibers, and the signal frequency component of the signal laser beam.

18. The method of claim 17 wherein the signal frequency component of the signal laser includes a wavelength of about 0.5 microns to about 2 microns, the pump frequency component of the one or more pump lasers includes a wavelength of about 1 micron to about 2 microns, and the wavelength of each of the pump frequency components is greater than the wavelength of the signal frequency component.

19. The method of claim 17 wherein tuning the idler frequency component comprises one or more of varying the gas pressure of the one or more hollow core photonic crystal fibers between about 1 atm to about 200 atm for coarse tuning of the idler frequency component or varying the gas temperature of the one or more hollow core photonic crystal fibers between about 273K to about 400K for fine tuning of the idler frequency component.

20. The method of claim 17 wherein the one or more hollow core photonic crystal fibers are disposed within a controlled environment and the control system is configured to control the gas pressure and the gas temperature of the one or more hollow core photonic crystal fibers by controlling a gas pressure and a temperature of the controlled environment.

* * * * *